UNITED STATES PATENT OFFICE.

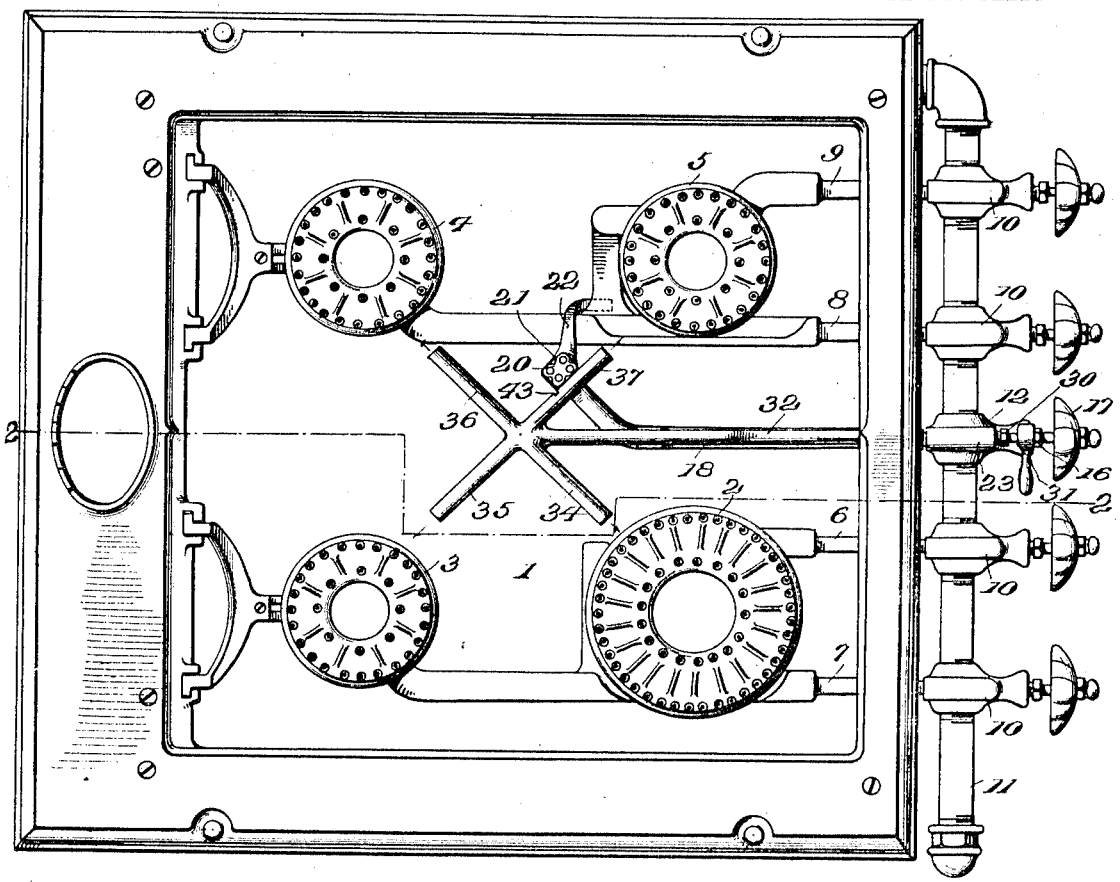

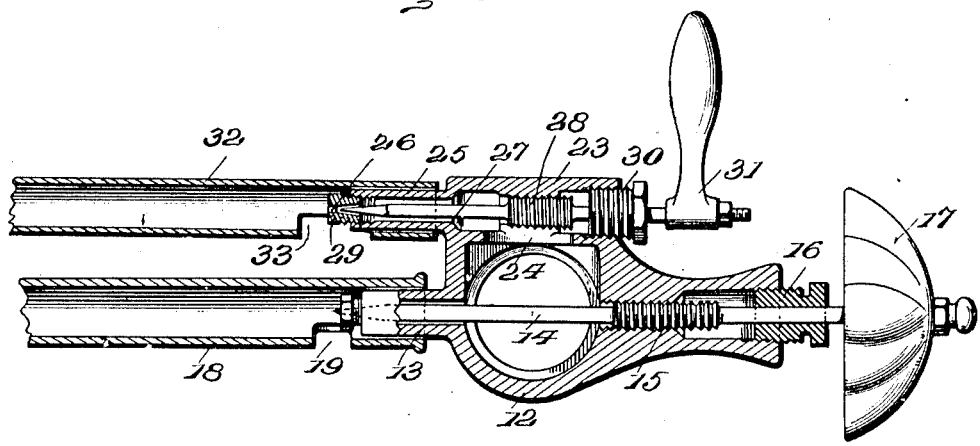
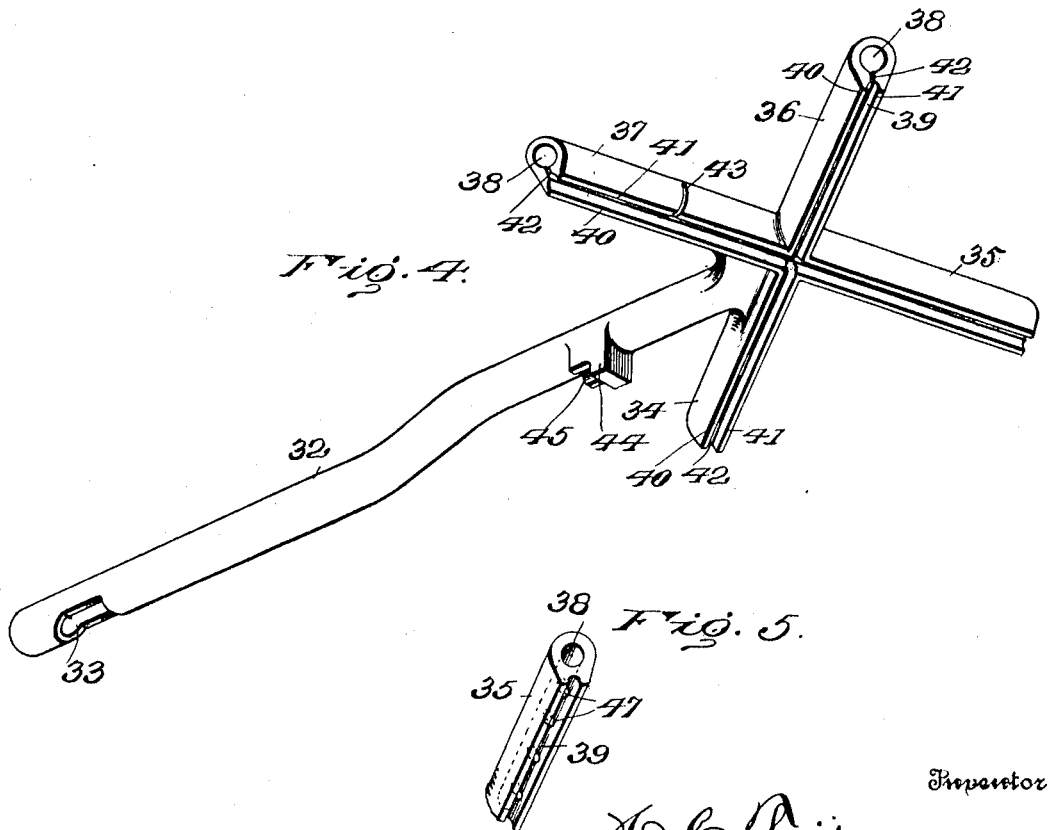

HERMAN C. FRITZ, OF CLEVELAND, OHIO, ASSIGNOR TO AMERICAN STOVE COMPANY, OF ST. LOUIS, MISSOURI, A CORPORATION OF NEW JERSEY.

LIGHTING DEVICE FOR GAS-STOVES.

1,061,738. Specification of Letters Patent. Patented May 13, 1913.

Application filed September 26, 1911. Serial No. 651,331.

*To all whom it may concern:*

Be it known that I, HERMAN C. FRITZ, a citizen of the United States, residing at Cleveland, in the county of Cuyahoga and State of Ohio, have invented certain new and useful Improvements in Lighting Devices for Gas-Stoves, of which the following is a specification, reference being had therein to the accompanying drawing.

My invention relates to improvements in lighting devices for gas stoves.

The object of my invention is to provide a lighting device which can be readily applied to the ordinary gas stove, and in which all of the burners can be readily lighted from the simmering burner, or in which any burner can be lighted. The arrangement is also such that all of the burners or any one of the burners may be lighted from any one of the other burners, when the simmering burner is extinguished.

Another object of my invention is to provide a simple, cheap and effective lighter of this character having certain details of structure hereinafter fully set forth.

In the accompanying drawings—Figure 1 is a top plan view of the ordinary gas stove, showing my improved lighting device applied thereto. Fig. 2 is a vertical sectional view taken on the line 2—2, Fig. 1. Fig. 3 is an enlarged vertical sectional view of the valves and the supply pipes for the simmering and lighting devices. Fig. 4 is a bottom perspective view of my improved lighting device. Fig. 5 is a perspective view of a modified form of the lighting arm.

Referring now to the drawings, 1 represents the upper end or top cooking surface of a stove equipped with the regular burners 2, 3, 4 and 5, which are arranged as shown, and supplied with gas by means of pipes 6, 7, 8 and 9. The said gas supply pipes are connected at their outer ends each to the valve 10 for controlling the flow of gas, which valves are in the main gas supply pipe 11, and the construction and arrangement of said valve being covered in a separate application. As shown there are four valves 10, one for each burner, and whereby each burner is independently controlled by its own valve.

In the gas supply pipe 11, at the center of the cooking surface 1, is a valve casing 12, which is provided with two separate valves which are independently operated for a purpose which I will now proceed to describe. The valve casing 12 is of a form very similar to the valve casing 10 and is connected up in the gas supply pipe 11 in the same manner as that of the valve casing 10. The valve casing 12 is provided at its inner face with an inwardly extending nipple 13, into which extends the valve stem 14, having at its inner end a beveled needle valve closing an opening in the outer end of the nipple, and whereby the flow of gas from the nipple is controlled. The outer end of the valve stem has a threaded connection 15 with the casing and passes outwardly through a stuffing box or gland 16, and provided with an operating wheel 17, whereby the valve is readily operated. Loosely fitting on the nipple 13 is a tube 18, which receives the gas from the nipple 13. The said tube adjacent the nipple is provided in its lower face with an opening 19, through which air is drawn by force of the gas as it enters said tube. The inner end of said tube is provided with a slightly enlarged chamber 20, having openings 21 in its upper face and forms a simmering burner, which is for the purpose well understood by those familiar with the use of a gas stove or range. The said enlarged chamber 20 is provided with an arm 22 formed integral thereto, which extends over and around the gas supply pipe 8 of the burner 4, and whereby the outer free end of the simmering burner is supported. The valve casing 12 at its upper end is provided with an enlarged portion 23, having communication therewith through the opening 24. The inner end of the said enlarged portion is provided with an inwardly extending nipple 25, having an opening 26 in its outer end into which extends the needle valve stem 27. The inner end of said valve stem is screw-threaded at 28 with the enlarged portion and whereby the valve stem is moved in or out to close the opening 26. The opening 26 is preferably in a removable plug 29 in the outer end of the nipple, whereby the nipple may be readily cleaned if it becomes clogged. The extreme inner end of the valve stem 27 extends through a packing gland 30, and is provided with an operating lever 31, whereby the valve is easily operated by a partial turn of the lever.

Loosely fitting on the inner end of the nipple 25 is a tube 32, which is provided with an opening 33, through which air is drawn by ejection of the gas into the same from the nipple 25, and whereby the proper mixture of gas and air is obtained in the tube. The outer end of said tube 32 has connected thereto four radially extending arms 34, 35, 36 and 37, which are in communication with the tube and extend adjacent the burners 2, 3, 4 and 5, as clearly shown in Fig. 1 of the drawings. The said arms 34, 35, 36 and 37, as shown, are of a tubular form and have open outer ends 38, as shown in Fig. 4 of the drawings. The lower face of each arm is provided with a groove 39, forming lips 40 and 41, on each side thereof. The bottoms of said grooves have slits 42 communicating with the grooves and with the interior of the circular hollow arms, and said slits all communicating with each other at the center or at the point of juncture of the four arms 34, 35, 36 and 37.

The lips 40 and 41, formed by the grooves prevent any drippings from the pans or boiling over of the food being cooked from entering the slits and stopping up the same. As will be readily seen anything dropped upon the arms will run down and run off or be burned off of the lips and can not possibly enter the slits. The arm 37, as shown in Figs. 1 and 4, is provided with a transverse slit 43, which is so located upon the arm that it is close to the simmering burner and forms means whereby the lighting device is ignited from the simmering burner, as will be hereinafter more fully described.

The tube 32 intermediate its ends is provided with a lug 44 having a V-shaped recess 45 therein, which rests upon a V-shaped lug 46 carried by the tube 18, and whereby the lighting device is firmly supported in the position shown in Fig. 1 of the drawings with the ends of the arms adjacent the burner.

In operation, if the simmering burner is lighted the gas is turned on at the burner which is desired to be lighted and which for the purpose of describing the operation I will assume that it is desired to light the burner 2. The gas having been turned on to the burner 2, the lever 31 is turned a part of a turn which admits gas to the tube 32 and the proper mixture travels outwardly into the arms 34, 35, 36 and 37. The gas or mixture escapes from the slit 43 and is ignited by the simmering burner. The flame travels downwardly and burns from the slits 42 and travels across all of the arms and burns from the lower face or at the slit in all of the arms. This brings the flame in the arm 34 close to the burner 2 and the same is ignited. When the desired burner or burners are ignited, the lever 31 is turned to cut off the gas and the lighter is extinguished.

When the simmering burner is not lighted and it is desired to light the stove, the burner desired to be used is lighted in the usual manner. For the purpose of illustration, I will assume that the burner 2 has been lighted as above described. If it is desired to light the burner 4, the valve controlling the gas thereto, is first opened. The valve lever 31 is then turned and lighting arms 34, 35, 36 and 37 are supplied with gas and it travels outwardly to the open ends. The gas at the open end of the arm 34 is ignited from the burner 2 and the flame travels along and burns from the slit at the lower face of the arms and ignites the gas at the outer open ends of the arms. The open end of the arm 36 is close to the burner 4 to which the gas supply has been turned on and thus the burner 4 is ignited. From this operation it will be seen that if one burner or the simmering burner is lighted all of the burners can be lighted or the simmering burner can be lighted.

While I have described this method of lighting the burners it will be understood that after one burner is lighted then the lighter may be ignited from the lighted burner as before described and when the gas to the other burners which you desire lighted is turned on there would be no escape of gas from any of the burners.

In the modification shown in Fig. 5 instead of having the slits 42 in the arms of the lighter, the same are provided with openings 47, which communicate with the bottom of the groove 39, and with the interior of the arm. It has been found that where the openings are used, the gas will ignite from the open end of the arm and travels across the arm, the same as where the slits are used.

Having thus described my invention, what I claim and desire to secure by Letters Patent is:

1. A lighter comprising a tube and radially arranged hollow arms in communication with said tube and having open outer ends, the lower face of said arms having grooves terminating in slits extending from the open ends to the tube and communicating with the hollow portion of the arms, whereby a depending flange is formed on each side of the slit, substantially as shown and described.

2. The combination with a stove having a series of burners, of a simmering burner between said burners, a lighter between said burners and composed of radially arranged arms extending adjacent the burners and having slits in their lower face communicating with each other, the arm adjacent the simmering burner having a transverse slit communicating with the slits to allow the lighter to be ignited from said simmering burner.

3. The combination with a stove having a series of burners, of a simmering burner between said burners, a valve for each burner, a lighter between said burners and composed of radially arranged arms extending adjacent the burners and having slits in their lower face communicating with each other, and a valve for said lighter.

4. The combination with a stove having a series of burners, of a gas supply pipe, a valve in said pipe for each burner, a simmering burner between the burners, a lighter between the burners, a valve casing in the gas supply pipe, a nipple extending inwardly from the valve casing for supplying the simmering burner with gas, a valve controlling said nipple, a second nipple in communication with the valve casing above the first nipple and adapted to supply the lighter with gas, and a valve controlling the said second nipple.

5. The combination with a gas stove, having a series of burners, of a simmering burner between the burners, a separate valve for each burner, a lighter supported by the simmering burner and having radially arranged arms extending adjacent the first named burners, and having open outer ends, the lower face of said arms having longitudinal slits communicating with each other at their inner ends, one arm having a transverse slit adjacent the simmering burner and communicating with the longitudinal slit, and a valve controlling the supply of gas to the lighter.

6. A lighter comprising a tube and hollow arms in communication with the said tube, the lower face of said arms having grooves and slits in the upper walls of said grooves and communicating with the interior of the arms.

In testimony whereof I hereunto affix my signature in the presence of two witnesses.

HERMAN C. FRITZ.

Witnesses:
Wm. C. Lehman,
W. J. Haven.